July 26, 1938.  C. S. EVANS  2,124,550
MEASURING INSTRUMENT
Filed May 24, 1933   2 Sheets-Sheet 1
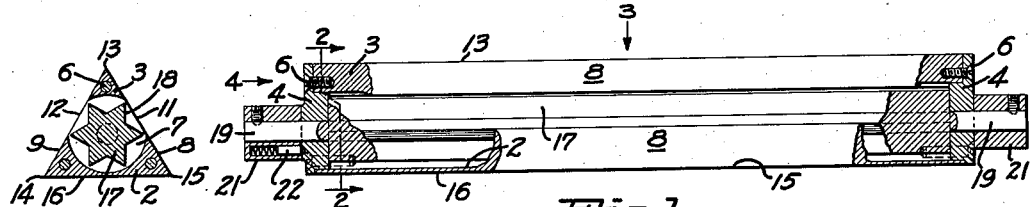
INVENTOR
Charles S. Evans July 26, 1938.   C. S. EVANS   2,124,550
MEASURING INSTRUMENT
Filed May 24, 1933   2 Sheets-Sheet 2
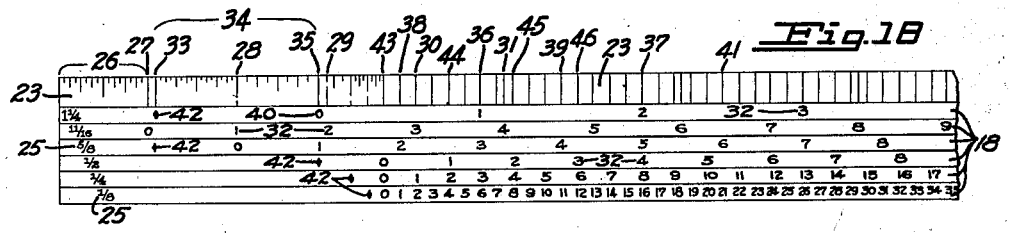
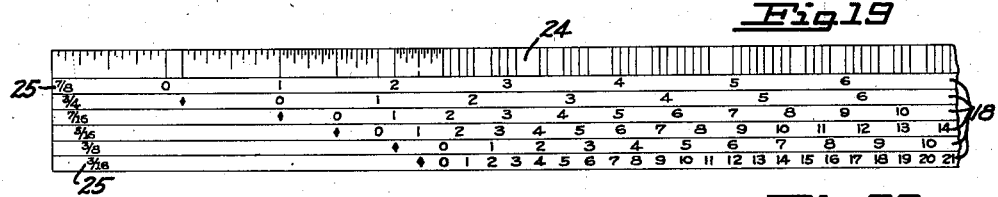
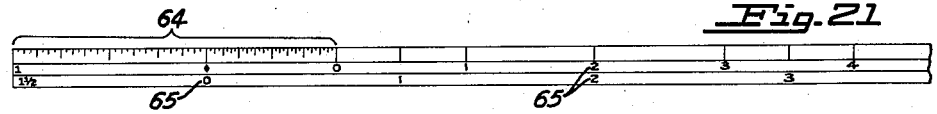
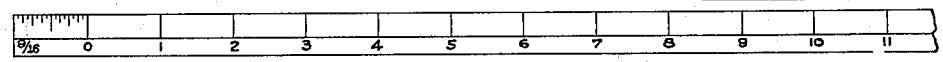
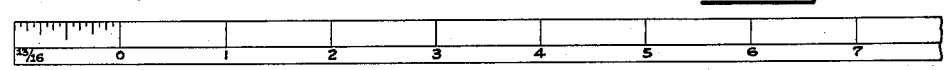
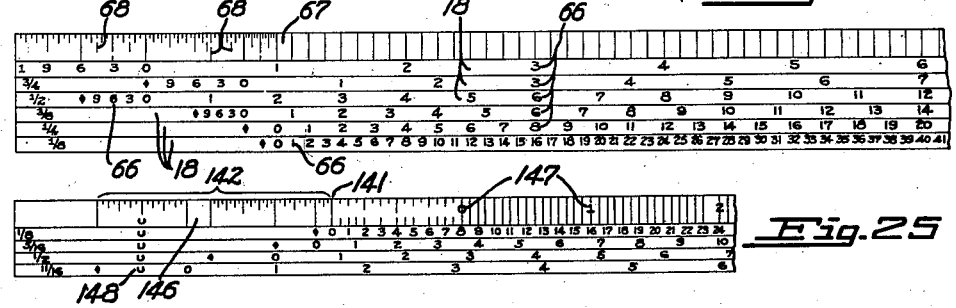
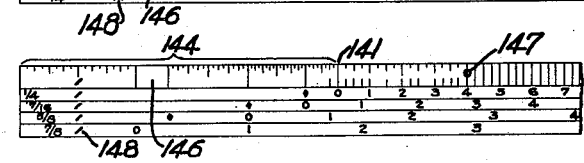
INVENTOR.
Charles S. Evans Patented July 26, 1938

2,124,550

UNITED STATES PATENT OFFICE 2,124,550

MEASURING INSTRUMENT

Charles S. Evans, Oakland, Calif.

Application May 24, 1933, Serial No. 672,648

20 Claims. (Cl. 33—111)

The invention relates to a linear measuring instrument; and the broad object of the invention is the provision, in one instrument, of a plurality of instantly available, easily legible scales.

In a more restricted sense, the invention has among its objects, the provision of a measuring scale in which the graduations are spaced at intervals such as to permit ready use without eye strain, and in which the graduations may be given selected values so that but a single selected legible scale is before the eyes at any given period of use; and an instrument by which is avoided the confusion and waste inherent in an instrument in which the scale to be used is one of several exposed according to the position of the scale on the paper.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a side view, partly in section and partly in elevation, showing a form of measuring instrument embodying the improvements of my invention; and Figure 2 is a transverse vertical sectional view of the same taken in a plane indicated by the line 2—2 of Figure 1.

Figure 3 is a plan view of the instrument, taken in the direction of the arrow 3 of Figure 1; and Figure 4 is an end view of the same.

Figure 5 is a side view, also partly in section and partly in elevation, showing another form of instrument embodying my invention; the central portions of the instrument being omitted to shorten the view; and Figure 6 is a transverse vertical sectional view of the same, taken in a plane indicated by the line 6—6 of Figure 5.

Figure 7 is a fragmentary side elevational view showing the end portions of the instrument of Figure 5; and Figure 8 is a transverse vertical sectional view of the latter form of instrument, taken in a plane indicated by the line 8—8 of Figure 5.

Figure 9 is a transverse vertical sectional view of another form of instrument embodying my invention.

Figure 10 is a fragmentary side elevational view of still another embodiment of my instrument; and Figure 11 is an end view of the same.

Figure 12 is a side view, partly in section and partly in elevation, of a further embodiment of my instrument, with the central portions of the instrument omitted to shorten the view; and Figure 13 is a vertical sectional view of the same, taken in a plane indicated by the line 13—13 of Figure 12.

Figure 14 is an elevational view showing the internal construction of the instrument illustrated in Figures 12 and 13; the central portions of these structural elements also being omitted to shorten the view.

Figure 15 is a side elevational view, with central portions omitted, of still another embodiment of my invention; and Figure 16 is a transverse vertical sectional view of the same, taken in the plane indicated by the line 16—16 of Figure 15.

Figure 17 is a transverse vertical sectional view of another form of instrument embodying the improvements of my invention.

Figures 18 and 19 are diagrammatic views showing the relation between scale faces of the instrument shown in Figure 1 and the several series of indicia which appear on the flat surfaces of the star-shaped rotor of that instrument; and Figures 20 to 23 are diagrammatic views showing the fixed scales appearing on the form of instrument shown in Figure 1.

Figure 24 is a diagrammatic view similar to that of Figures 18 and 19, but showing other scale evaluations.

Figures 25, 26 and 27 are diagrammatic views showing another arrangement of the scales and evaluating indicia, particularly adapted for the instruments shown in Figures 6 and 13.

In terms of broad inclusion, the measuring instrument of my invention comprises an elongated block or shell having edges on which graduations are disposed. The graduations are selected to conform with space lengths representing desirable parts or multiples of a linear unit, and different combinations of these graduations appear on different edges. The block or shell is broadly triangular or rhomboidal in transverse section, and both sides of the same edge may be utilized for the graduations. A rotarily movable member or rotor is journaled within the block and provides space for displaying a plurality of series of indicia which are selectively moved into evaluating relationship to the graduations by rotation of the rotor. Means are provided for lightly retaining the rotor in selected position.

In greater detail and with primary reference to Figures 1 to 4 inclusive and 18 to 23 inclusive, my measuring instrument comprises a block or shell conveniently made by securing the base 2 and rail 3 between end plates 4. This is preferably accomplished by interfitting the end plates to the base and rail ends and fixing them in position by screws 6. Preferably the shape of the complete block or shell as shown in Figure 2 is that of an equilateral triangle in transverse section, with a cylindrical recess 7 extending longitudinally through the block and opening on each of the upper sides 8 and 9 in long apertures 11 and 12 respectively, the edges of which are parallel to the edges 13, 14 and 15 of the block. This construction leaves the bottom side 16 intact.

Journaled in the end plates for rotation in the recess 7 is a rotor 17, shaped so that a transverse section has the outline of a regular six-point star. This provides twelve flat surfaces 18 on the rotor; and the proportion of parts is such that two of these surfaces are exposed in each of the apertures 11 and 12, the edges of the rotor lying closely adjacent the aperture edges.

The journals 19 on which the rotor is mounted are extended through the end plates, and are provided with knurled sleeves or knobs 21 so that the rotor may be readily turned with the fingers. Between one of the sleeves and the adjacent plate, is interposed a spring-pressed pin 22, adapted to seat in shallow depressions in the plate. The depressions are so spaced that when engaged by the pin, the rotor edges are always aligned with the aperture edges as shown in Figure 2. Unintended rotation of the rotor is thus avoided. Of course this rotor might be hexagonal in section, but the star shape is preferred because it provides a better location for the indicia.

Disposed on the upper and bottom sides 8, 9 and 16, adjacent the edges 13, 14 and 15, are graduations representing various scales. The arrangement of scales is open to wide variation, but a convenient arrangement places the scale 23, Figure 18, on the side 8, adjacent the edge 15; and the scale 24, Figure 19, on the side 9 adjacent the edge 14. In Figures 18 and 19, the graduated edges or scales 23 and 24 are shown; and below each in diagram, are shown the six indicia-bearing faces 18 of the rotor which serve each scale, each face bearing its own designation 25, which is to be read in inches in the present embodiment.

The scale 23 is a composite one; the long graduations extending across the scale face dividing it into spaces grouped in the following order, reading from the left: space 26, representing $\frac{11}{16}''$ set off to the left of the graduation line 27 and divided into sixteen parts by the short lines as shown. To the right, graduations 28, 29, 30, 31, etc. divide the edge into increments of $\frac{11}{16}''$ each. On one of the flat surfaces 18 of the rotor are disposed indicia 32 comprising numbers 0, 1, 2, 3, 4, etc. in registry with the graduations 27, 28, 29, 30, 31, etc., so that distances may be readily read or set off in the ratio of $\frac{11}{16}''$ to 1''.

To the right of graduation 27 and spaced $\frac{1}{16}''$ therefrom is graduation 33, marking the beginning of space 34, representing 1¼'', ending at graduation 35. This space is divided into sixteen parts, and similar length spaces are set off to the right being marked by graduations 36, 37, etc. Indicia 40 for evaluating this scale are arranged on another of the rotor faces 18. The left half of the space 34 is further subdivided to provide the fractional parts of the $\frac{5}{8}''$ scale as shown, the graduations 35, 38, 36, 39, 37, 41, etc. marking $\frac{5}{8}''$ increments to the right of the 0 line, 28. A diamond-shaped mark 42 on the rotor marks the left end of the fractional division space of each scale, except the $\frac{11}{16}''$ scale which terminates at the end of the scale bar.

It is to be noted that the space between graduations 27 and 33 is $\frac{1}{16}''$, the difference between the $\frac{11}{16}''$ and the $\frac{5}{8}''$ spaces; and that by use of this "dead" space between the fractional division spaces, the graduation lines of both scales either coincide, as in line 28, or fall at regularly spaced intervals, as in lines 35 and 29, 38 and 30, etc. This expedient permits the arrangement of many scales together on the same edge without confusion or the spacing of graduations at irregular intervals or so close as to make reading without confusion and strain impossible.

Graduation 35 also marks the beginning of the fractional division space of the ½'' scale, the 0 line being graduation 43, and increments of ½'' each being marked by graduations 44, 45, 46, etc. Scales representing ¼'' and ⅛'' are also arranged as shown. Detailed explanation of these scales is unnecessary in view of the explanation already given, it being remembered that for each group of spaces, ⅛'', ¼'', ½'', ⅝'', etc. there is a series of indicia disposed on a flat face 18 of the rotor, and that the rotor may be turned at will to position the selected face, so that its numbers give value to the corresponding graduations.

The graduations just explained comprising the scale 23, Figure 18, are arranged on the side 8 near the edge 15. The graduations shown in Figure 19 comprising the scale 24, are preferably arranged on the side 9, adjacent the edge 14. On the same side adjacent the top edge 13, is arranged a 1'' and 2'' scale 51, Figure 20; the graduations 52 constituting the fractional division space of the 1'' scale and the graduations 53, 54, 55, etc. marking out the whole units to the right of the 0 line 56. The graduations 57 together with graduations 52 constitute the fractional division space of the 2'' scale, extending to the left of the graduation 53; the whole units extending to the right and being defined by the graduations 55, 58, etc. These graduations are evaluated by two rows 61 and 62 of indicia 63 as shown; and since the top edge scales are not served by the rotor, these rows of indicia are printed directly upon the side of the instrument. On the opposite side 8 adjacent the top edge 13, the scales and evaluating rows of indicia shown in Figure 21 are disposed, the graduations 64 being spaced to give the 1½'' and the 1'' scales which are evaluated by the indicia 65 as already explained in connection with Figure 20. It will be noted that a 1'' scale is included on each side of the top edge 13, so that irrespective of what scale is set up on the rotor, the 1'' scale is available by merely turning the instrument over on its side without disturbance of the rotor setting.

The bottom face 16 is also conveniently available for graduations with fixed indicia; and since the $\frac{7}{16}''$ and the $\frac{13}{16}''$ scales are not in frequent use, they may be disposed on the bottom face adjacent the edges 14 and 15 respectively. They will appear as shown in Figures 22 and 23. It will of course be understood that a great many other arrangements of scales may be made, those illustrated being merely typical.

In Figure 24 is shown diagrammatically, the rotor faces 18 bearing indicia 66 for evaluating the graduations on the scale 67 which is shown divided into fractional parts of feet, constituting a scale preferred by architects. In this case the use of detached short lines 68, is useful to the eye in reading certain of the graduations. Explanation previously given will make the application and use of this scale clear.

From the foregoing, the construction indicated by Figures 9, 11, 16 and 17 will need little or no explanation. In Figure 9 is shown a cross sectional view through an instrument in which the rotor 75 is cylindrical. The indicia to evaluate the graduations on the scale edge 76 are arranged on the cylinder in lines or groups visible through the aperture 77 between hood 78 and body 79. The straight edge 80 may be provided with a fixed scale if desired.

In Figures 10 and 11 are shown an instrument in which the scale bar 82 may have graduations on both faces. End plates 83 enclose the octagonal rotor 84, on each face 86 of which are two rows of indicia, each row inverted relative to the other, so that the graduations on each scale face are evaluated by indicia closely adjacent the upper or inner edge of the scale face. The rotor is provided at each end with a trunnion 87 connected by spring 88 with the screw 89 securing the end plate to the scale bar. The spring and trunnion lie in a recess in the end plate, and two faces of the rotor seat in a complementary socket in the rear face of the scale bar, so that in position of use the rotor and bar are in effect a unit, while permitting quick and easy adjustment of the rotor to evaluate the graduations on the scale bar in accordance with need. Eight different scales in each scale face, or sixteen in all, are available in this instrument.

In Figure 16 is shown a construction similar to that of Figure 9 except that the rotor is in the form of an endless band 90 mounted on rolls 91 on the larger of which the knurled handle 92 provides means for setting up the desired indicia for the scale on the scale face 93.

Figure 17 shows a structure in which the rotor 94 is cylindrical, the indicia appearing in double rows, inverted relative to each other, between the scale faces 95 and 96. The opposite faces 97 may be provided with any desired fixed scales. Screws 98 set in the body of the block secure the end plates in which the rotor is journaled.

In Figures 5 to 8 inclusive is shown a type of instrument having the great advantage of a large number of scales immediately available without the need for reversal end for end and without graduations on the scale faces being confusingly close. A long central core or block 101 is provided with scale bars 102 so that an instrument having an equilateral triangle section results. The shape of the parts is such that a cylindrical chamber 103 is left adjacent each of the three scale faces 104; and in each chamber is mounted a rotor 106 having, say four indicia bearing surfaces 107, for giving values to the graduations on the adjacent scale face. Thus each scale face is graduated for but four scales which gives twelve scales instantly available, with only clockwise rotation of the rotors or whole instrument. Of course the rotors may be shaped to carry more groups of indicia if desired so that a very wide range of scales is possible in the one instrument.

Means are provided for the separate or simultaneous control of the three rotors. Each rotor is journaled in the end plates 108 and 109, and at one end is provided with a control knob or handle 111, between which and the end plate is arranged the spring-pressed pin 112 for resiliently retaining the rotor in adjusted position. At the other end of the instrument, the end plate is extended into a hub 113 in which the short shaft 114 is journaled. On the outer end of this shaft is the knurled handle 116, and on the inner end a driving gear 117 normally in mesh with three reversing gears 118, always in mesh with gears 119 fixed on the ends of the rotors, so that rotation of the handle 116 effects simultaneous and equal rotation of the three rotors in the same direction preferably clockwise as seen in Figure 6.

The inner end of the hub is recessed so that the shaft 114 and gear 117 may be drawn into the hub out of mesh with the reversing gears. A spring 121 normally resists this movement. When the gear is disengaged, the handle may be turned slightly to seat the inner end of the handle on the pin 122 fixed in the hub, thus holding the driving gear out of engagement and permitting separate movement of the rotors. A longitudinally extending groove 123 in the handle 116 permits the outward movement of the handle, and the annular groove 124 permits turning of the handle when the gears are in their normal position of engagement.

When the several rotors are locked for rotation together, the indicia presented to the scale faces in a given position of the rotors are indicated by indexing notations appearing on the drum of the handle 116 and visible through suitable apertures 126 provided in a shield 127 mounted on the end plate 108. Convenient scales for this type of instrument are shown in Figures 25, 26 and 27, and will be described in connection with the construction shown in Figures 12 to 14 inclusive to which they are also applicable.

Figures 12 to 14 show a form of instrument in which a shaft 128, carrying a plurality of pivotally mounted indicia bearing blades 129, is journaled in a recessed block 130 having a scale face 131. Rotation of the shaft 128 is effected by a knob 132 carrying a spring-pressed pin 133, seating in suitable sockets arranged about the block 130, for resiliently fixing the rotor in adjusted position. A hood 134 is provided on the block 130, enclosing the back of the blades 129, and terminating in a downturned lip 135, spaced from the forward or scale face 131 of the block 130. The lip 135 provides a stop against which the blades are held prior to dropping down into their operating position on the block, where the outer edge lies snugly in a rabbet formed in the upper edge of the scale block 131, as shown in Figure 13. In order to insure movement of the blades into their operating position when the rotor is turned and to hold them in the latter position, each is provided with a very light spring 136, as best shown in Figure 14. The thrust of the blade against the block tends to impart a backward movement of the rotor, but this movement is prevented by the spring-pressed pin 133 and also by the direct thrust of other blades against the inside of the hood, as will be clear from Figure 13. By this arrangement, turning of the knob 132 causes the indicia carrying blades 129 to snap, one after another, into registration with the scale face 131.

In order to avoid a close spacing of graduations on the scale bar, especially in the fractional division spaces, the scale bar portion of the block 130 is provided, preferably at the left end considered from the position of use, with a rotatable section 138, fixed on the pin 139, journaled in the block in a recess formed therein for the purpose.

This rotatable scale bar is triangular in transverse section as shown; and may be rotated to register different faces with the fixed scale face 131. A spring-pressed pin similar to that shown in Figure 1 resiliently retains the section in adjusted position.

The scales shown in Figures 25, 26 and 27 may be used on this instrument, the graduations 141 being coincident with the inner end of the rotatable section, so that the graduations marking the fractional divisions 142, 143 and 144 appear to the left of the graduation 141 and on the three scale faces of the rotatable section of the scale bar. By grouping the fractional divisions as shown, with "dead" spaces 146 as needed, all confusion of lines in the fractional division is avoided.

On the fixed scale face to the right of the graduation 141, the graduations are not closer than $\frac{1}{16}$"; and each of the series of indicia are readily applied to it. In order to provide a 1" scale which is available at all times, the fixed scale face is provided with fixed indicia 147 spaced at 1" intervals from the graduation 141 as shown. The first space is subdivided into 16ths and this constitutes the fractional division for the inch scale. As applied to the construction shown in Figure 13, the graduations of the fixed scale face will appear as shown in Figure 25.

While it is quite obvious in practice that the indicia exposed either do or do not match up with fractional divisions on the active scale face, thus indicating when the rotatable section must be adjusted, identical marking of the indicia bearing surfaces and the related scale face may be provided, such for example as a symbol 148. If desired the indicia groups on the blades may be arranged in the order of magnitude, that is from smallest to largest scale, in which case, for example the fractional divisions on one edge of the rotatable section would be those pertaining to the $\frac{1}{8}$", $\frac{3}{16}$", $\frac{1}{4}$" and $\frac{5}{16}$" scales. These are laid out by applying the principles already presented; that is, laying out the fractional divisions to the left of a zero graduation, beginning with the smaller divisions so that the larger may step over them and interposing "dead" spaces to secure coincidence of graduation lines, or keep them recognizably separated.

The scales of Figures 25, 26 and 27 are especially adapted for the construction shown in Figure 6, in which the gear connection of the rotors for unified control may be such that the $\frac{1}{8}$", $\frac{3}{16}$" and $\frac{1}{4}$" scale evaluations are exposed simultaneously on the surfaces 107 of the three rotors. The remaining values are then successively exposed in groups of three, by turning the knob 116, thus $\frac{5}{16}$", $\frac{3}{8}$" and $\frac{7}{16}$"; then $\frac{1}{2}$", $\frac{9}{16}$" and $\frac{5}{8}$"; then $\frac{11}{16}$", $\frac{3}{4}$" and $\frac{7}{8}$". All of the scales are thus available successively by clockwise rotation of the whole instrument or of the control knob 116. In this type of scale, the graduations on the three scale faces 104 may correspond with the graduations shown in Figures 25, 26 and 27. It will be clear of course that many other scale groupings and values may be applied as special conditions require. Those explained are merely illustrative.

It will be clear from the above that an instrument providing twelve to sixteen fractional and multiple scales, in addition to the inch scale, any of which are instantly available, and readily legible, confers great facility in laying out drawings having a selected scale ratio to other drawings or to the object drawn; and, that in this regard it is far easier to use than proportional dividers, and within the range of its fixed increment capacity, just as accurate and effective.

Thus if the patent draftsman is given a blueprint drawn to full scale, he can measure with the inch scale such parts as are not dimensioned and lay off another drawing at any scale to fit the space available. Again if the blueprint or sketch is drawn to any fractional scale approximating the values of the instrument; the full size dimensions may be read directly, and in almost a simultaneous operation laid off in a drawing of another selected scale. Thus a drawing at a scale of ½ to 1, too large for use, may be set off anew at a scale of $\frac{5}{16}$ to 1; it being necessary only to read a value on one scale and set it off on the other. In many combinations, both scales would be available without even movement of the rotor. These uses are additional to those commonly attached to the draftsman's scale or set of scales.

I claim:

1. A measuring instrument comprising a scale having graduations arranged thereon in groups having different ratios to a linear scale, a rotor arranged adjacent the scale, and indicia arranged on the rotor for giving a linear value to the graduations in each group.

2. A measuring instrument comprising a block having a plurality of graduated scales disposed thereon, a rotor journaled on the block, and rows of indicia disposed on the rotor for labeling the scales.

3. A measuring instrument comprising a block having a plurality of graduated scales disposed thereon, a flat faced rotor journaled on the block, and indicia disposed on the flat faces of the rotor for labeling the scale graduations.

4. A measuring instrument comprising a block having a graduated scale disposed thereon, a rotor journaled on the block, pressure applying means for lightly retaining the rotor in position, and indicia disposed on the rotor for labeling the graduations in linear units.

5. A measuring instrument comprising a prismatic block, a graduated scale disposed on a longitudinal edge of the block, means rotatable about an axis sufficiently parallel to said edge, pressure applying means interposed between the block and rotatable means for retaining the rotatable means in position, and indicia disposed on said rotatable means for labeling the graduations in linear units.

6. A measuring instrument comprising an elongated block of triangular transverse section, graduated scales on a plurality of the edges of said block, a rotor journaled within the block and having faces which in positions of rest are juxtaposed to respective graduated scales, and indicia disposed on the faces for labeling the graduated scales in linear units.

7. A measuring instrument comprising a long prismatic block, a plurality of graduated scales disposed on edges of the block, a plurality of surfaces mounted on the block for movement into close proximity with the scales, and indicia on the surfaces for labeling the graduations.

8. A measuring instrument comprising an elongated block of triangular transverse section, graduated scales on a plurality of the edges of said block, a rotor journaled within the block and with a transverse section having the outline of a six-point star to provide faces on the rotor adapted to be juxtaposed to the scaled edges, and indicia disposed on the faces of the rotor to evaluate the graduated scales.

9. In a measuring instrument a scale comprising a zero graduation, graduations on one side of the zero graduation and defining a plurality of spaces representing values related to a linear unit, graduations for dividing such spaces into selected fractional parts, and graduations spaced across the scale from the inner end of each of said fractionally divided spaces to set off on the scale face a plurality of overlapping series of spaces, and means bearing indicia for evaluating each of said series.

10. In a measuring instrument, a scale comprising graduations for defining a plurality of overlapping series of spaces, the spaces having values related to a linear unit and being equal in each series, graduations dividing one space in each series into fractional parts, and indicia for evaluating each of said series.

11. A measuring instrument comprising a straight-edge, a series of unlabeled graduating lines spaced along said edge and providing a scale, a second series of unlabeled graduating lines on said edge and superimposed on the first series of lines to provide a second scale, means coextensive with said straight-edge and movable with respect thereto, a row of indicia on the movable means for labeling the first series of lines in accordance with their linear scale value, and a second row of indicia on the movable means for labeling the second series of lines in accordance with their linear scale value upon movement of the means.

12. A measuring instrument comprising a block having an edge with a plurality of graduated scales arranged thereon in groups having different ratios to a linear scale, means movable with respect to the scales and having a series of indicia arranged thereon to give a linear value to the graduations in each group when moved into juxtaposition therewith.

13. A measuring instrument comprising a prismatic block having at least one edge bounded by planes lying at an acute angle to each other, a series of graduations disposed on said edge, a rotor journaled on the block, and indicia disposed on the rotor for labeling the graduations in linear units.

14. A measuring instrument comprising an elongated block of triangular transverse section, a plurality of graduated scales on at least two of the edges of the block, a rotor journaled in the block adjacent each of the scaled edges, and indicia disposed on each rotor for labeling the graduated scales of the nearest scaled edge.

15. A measuring instrument comprising an elongated block of triangular transverse section, a plurality of graduated scales on at least two of the edges of the block, a rotor journaled in the block adjacent each of the scaled edges, indicia disposed on each rotor for labeling the graduated scales of the nearest scaled edge, and means for effecting simultaneous and correlated movement of the rotors.

16. A measuring instrument comprising an elongated block of triangular transverse section, a plurality of graduated scales on each of the long faces of the block adjacent corresponding edges thereof, a rotor journaled in the block adjacent each of the scaled edges, indicia disposed on each rotor for labeling the separate scales of the nearest scaled edge, means for effecting the simultaneous and correlated movement of the rotors, and indicating means for showing the setting of all of the rotors.

17. A measuring instrument comprising an elongated block, a straight-edge of equilateral cross section pivotally mounted in a long edge of the block and rotatable to provide three different edge-faces therefor, graduated scales on the edge-faces, means movable with respect to the straight edge, and indicia on the movable means for labeling the graduated scales of the straight edge.

18. A measuring instrument comprising an elongated block, a straight-edge of equilateral cross section pivotally mounted in a long edge of the block and rotatable to provide three different edge-faces therefor, graduated scales on the edge-faces, a plurality of plates, means for moving the plates into and out of position relative to the straight edge, and indicia on the plates for labeling the graduated scales of the straight edge.

19. In a measuring instrument, a scale comprising graduations arranged to provide a space having the value of a fractional part of a linear unit, graduations arranged to provide a second space having the value of another fractional part of the unit and separated from the first space by a third space equal to the difference between the first and second spaces, graduations arranged to provide series of spaces to the side of the combined first, second and third spaces and equal respectively to the first and second spaces, and indicia for separately evaluating the series of spaces.

20. In a measuring instrument, a scale comprising graduations arranged to provide a space having the value of a fractional part of a linear unit, graduations arranged to provide a second space having the value of another fractional part of the unit and separated from the first space by a third space equal to the difference between the first and second spaces, graduations arranged to provide series of spaces to the side of the combined first, second and third spaces and equal respectively to the first and second spaces, a plurality of surfaces mounted for movement into close proximity with the graduations, and indicia on the surfaces for labeling the graduations.

CHARLES S. EVANS.